Dec. 24, 1957

L. S. G. KOVASZNAY 2,817,787

CATHODE-RAY-TUBE SWEEPS

Filed June 16, 1953

INVENTOR

*Leslie S. G. Kovasznay*

BY

AGENT

United States Patent Office 2,817,787
Patented Dec. 24, 1957

2,817,787

CATHODE-RAY-TUBE SWEEPS

Leslie S. G. Kovasznay, Baltimore, Md.

Application June 16, 1953, Serial No. 362,172

3 Claims. (Cl. 315—24)

(Granted under Title 35, U. S. Code (1952), sec. 266)

The invention described herein may be manufactured and used by or for the Government of the United States for governmental purposes without the payment to me of any royalty thereon in accordance with the provisions of 35 United States Code (1952) Section 266.

The present invention relates to a sweep for cathode-ray tubes and in particular to a sweep employing two triangular waves.

It is the primary object of the present invention to provide a sweep for a cathode-ray tube in which the beam travels at constant speed and changes direction almost instantaneously.

Another object of the present invention is to provide a sweep in which there is no fly-back time.

Another object of the present invention is to provide a sweep for cathode-ray tubes in which each incremental area on the surface of the tube is scanned from four different directions during each frame.

Another object of the present invention is to provide a sweep in which all sweep lines intersect at a fixed angle.

Another object of the present invention is to provide a sweep for cathode-ray tubes in which all incremental areas established by the sweep are of the same size.

Another object of the present invention is to provide a sweep for cathode-ray tubes which provides constant illumination across the face of the screen.

Another object of the present invention is to provide a sweep for cathode-ray tubes in which it is possible, if desired, to make the sweep travel in both the horizontal and vertical directions at the same speed.

Another object of the present invention is to provide a sweep for a cathode-ray tube in which there is no preferred direction on the face of the tube and all four independent directions are treated equally.

Other uses and advantages of the invention will become apparent upon reference to the specification and drawings.

Figure 1:
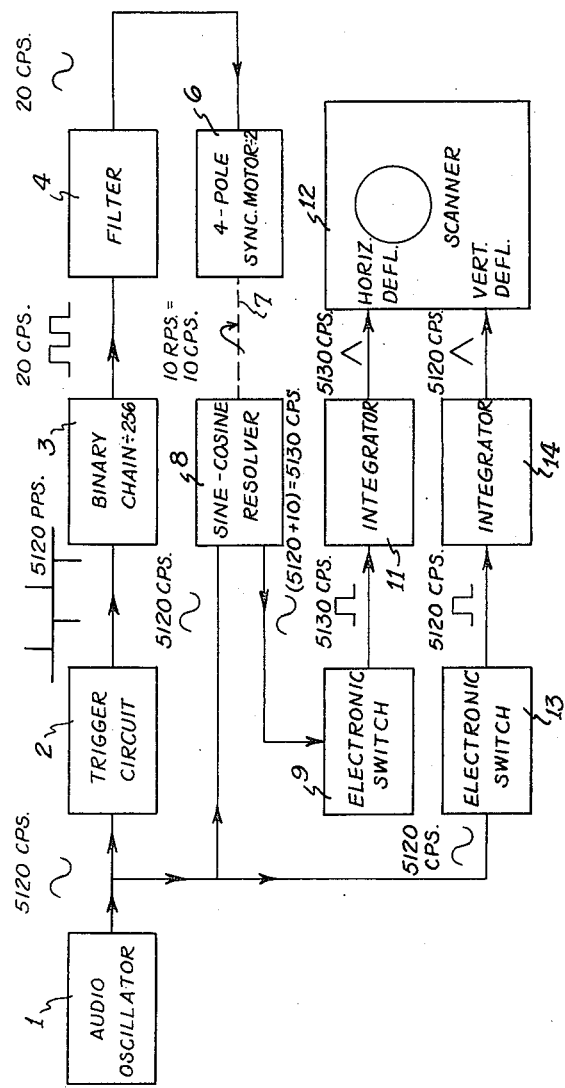
Figure 1 is a block diagram of one form of scanning generator suitable for use in the present invention.

In applicant's copending application No. 425,334, filed on April 23, 1954, directed to an Electro-Optical Contour Outlining Apparatus, there is disclosed an unique constant velocity scan which obviates the need for employing a system of complex memory circuits in connection with a conventional television raster scan in order to obtain the contour outlining described in such application. This type of constant velocity scanning obtains the desired degree of vertical and horizontal coverage of a frame area. The present invention is concerned specifically with the circuit means employed for deflecting the electron beam to obtain the novel constant velocity sweep pattern required in the image intensification system described in the referred-to-copending application.

According to the preferred embodiment of the present invention the objects are achieved by using two triangular waves of slightly different frequencies, one wave being applied to the vertical deflection plates of the tube and the other wave being applied to the horizontal deflection plates. In choosing the frequencies to be employed in any cathode-ray type of sweep, it is necessary to make two determinations initially. The first is to determine the number of frames per second, F, since the ability to present clear images of moving objects depends upon this frame rate. The second important consideration is the number of lines per frame, since the definition of the picture is dependent upon this.

The novel sweep pattern obtained is based upon the following considerations in which:

$F$ = frame frequency or frame repetition rate expressed as the number of frames per second;
$f_1$ = basic sweep frequency in cycles/second.

For a particular frame:

$M$ represents the number of cycles of the basic sweep frequency $(f_1)$ which occurs during a frame. It follows that:

$$F = \frac{f_1}{M} \quad (1)$$

Let
$f_2$ = a dependent or higher sweep frequency in cycles/second and
$M+1$ = number of cycles of sweep frequency, $f_2$, which occurs during a frame.
Then $$F = \frac{f_2}{M+1} \quad (2)$$

In order to obtain a stable pattern, the number of frames/second $(F)$ in each instance must be equal.

$$\therefore \frac{f_1}{M} = \frac{f_2}{M+1} \quad (3)$$

and $$\frac{f_1}{f_2} = \frac{M}{M+1} \quad (4)$$

From Equation 3

$$f_1 = \frac{f_2 M}{M+1}$$

by subtracting Equation 1 from 2, then $$f_2 - f_1 = \frac{f_1}{M} = F \quad (5)$$

The relationship between the factor M and the lines per frame may therefore be expressed as:

$$M + (M+1) = 2M + 1 = \tfrac{1}{2} L \quad (6)$$

Where $L$ = number of lines per frame.

The number of lines per frame therefore depends on the factor M, and F and M are the determining factors contributing to the desired sweep pattern.

Therefore by initially choosing the frame rate and the number of lines per frame, the frequencies $f_1$ and $f_2$ are immediately fixed.

The ratio $f_1/F$, which is equal to M, may have three different characteristics. First the ratio may be an integer in which case each frame is identical with the preceding frame. Secondly, the ratio may be a rational number but not an integer. In this case there would be $n$ different frames which repeat in groups of $n$ frames. This condition would be obtained if the number of cycles per frame of $f_2$ were made equal to some value other than $M+1$. Thirdly, the ratio may be irrational in which case every frame is different and never repeats. The first case is obviously the best to use since there will be no jitter of the raster. The other two rations may be used if the number of lines per frame is sufficiently large to approach the limits of definition, in which case the jitter would not be discernable.

Since, as pointed out above, F is equal to $f\%M$, which is equal to $f_2-f_1$, $f_2$ may be obtained by dividing $f_1$ by M, and adding the result to $f_1$. By employing this method, $f_2$ must necessarily hold a constant ratio to $f_1$ regardless of relatively slow variations in $f_1$.

Referring to Figure 1, there is shown a logical circuit for obtaining $f_2$ which employs the method set out above. The master audio oscillator 1 generates a sine wave having a frequency $f_1$ of 5120 cycles per second, this value being chosen merely for the purposes of the example. This wave passes through the trigger circuit 2, which produces a pulse output having a frequency of 5120. This output is fed to the binary chain 3 which divides the input by a factor of 256 and therefore the output of this chain is a 20 cycle-per-second square wave. These pulses are fed to the filter 4 which converts the square wave into a sine wave having a 20 cycle-per-second rate. This wave is fed to a 4-pole synchronous motor 6, which divides the frequency by two, and therefore the rotation rate of the shaft 7 of the motor 6 is 10 cycles per second. This shaft drives a sine-cosine resolver 8, the input of which is connected to receive the output of the audio oscillator 1. The 5120 cycles per second from the oscillator and the 10 cycles per second introduced into the resolver 8 by the motor shaft 7 are added together to produce in the output a sine wave having a frequency of 5130 cycles per second. This output is fed to the electronic switch 9 which converts the sine wave into square waves, the square waves in turn being fed to the integrator 11, which converts the square waves into triangular waves having a frequency of 5130 cycles per second. The triangular waves are fed to the horizontal deflection plate of the cathode-ray tube 12. The output of the audio oscillator 1 is also fed to the electronic switch 13 which converts the sine wave into square waves at a frequency of 5120 clycles per second. The integrator 14 converts the square wave to a triangular wave, which is fed to the vertical deflection plate of the scanner 12. It will be noted that in this way the frequency $f_2$ is displaced from frequency $f_1$ by a given ratio, and the ratio of $f_1$ to $f_2$ will remain constant regardless of variations of frequency $f_1$ within reasonable limits.

There are other convenient ways of obtaining these two displaced frequencies. One is the use of a master oscillator, the output of the oscillator being divided by two binary counters, or other suitable counters, the counters being designed to count down to the proper value, thereby establishing a constant ratio. Another way in which this can be done is by the use of mechanical scanning disks, which are nothing more than mechanical means for dividing a master frequency. The same results can be obtained by using frequency multipliers having two different multiplication constants, thereby obtaining a constant ratio between the two frequencies. If sufficiently constant oscillators are available, it might be possible to use a different generator for each frequency.

The embodiment shown in Figure 1 is designed to operate with a cathode-ray tube using electrostatic deflection, and therefore the apparatus is designed to produce voltages of the proper shape. If it is desired to use this system with a tube having magnetic deflection the apparatus would obviously be designed to produce currents of the proper shape. In either case the deflecting signals would necessarily be of the same geometric configuration.

Figure 2:
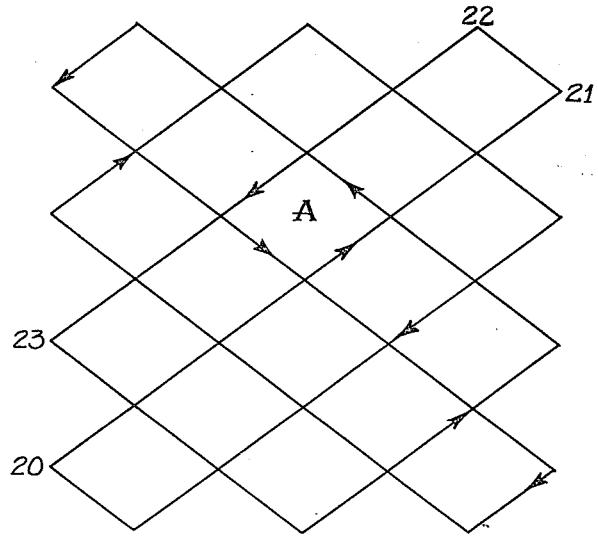
Figure 2 shows the pattern which is traced by the sweep of the present invention and the wave forms required for obtaining the sweep.
Figure 2:
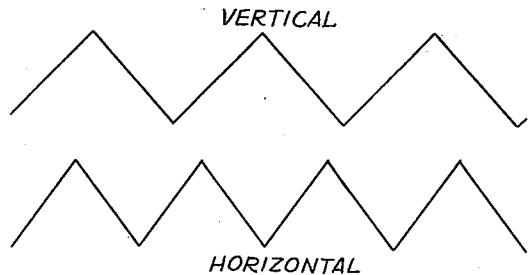

Figure 2 shows the type of wave which is obtained by the sweep of the present invention. In this figure very low sweep frequencies were used so that it would be possible to plot the pattern and, of course, to read it. In this case the scanning ratio of 3:4 was used; that is, M is 3 cycles per frame and $M+1$ is 4 cycles per frame. In this figure the sweep starts at the point 20, proceeds to points 21, 22, 23, and so on. When the entire frame is completed, the sweep returns to the point 20. It will be noted that the incremental area, A, has been swept in four different directions during a single frame by a beam travelling at a constant velocity regardless of the direction of approach of the sweep at any particular instant. It will be also noted that the area A has the same size as all other incremental areas swept during the frame, and that the beam has at no time during the frame or any series of frames been turned off. There is no need for the allowance of fly-back time in this sweep. In the pattern shown in Figure 2, although the beam travels at a constant velocity at all times owing to the use of triangular waves, it will be noted that the horizontal and vertical velocity components are not equal. This would be true only if the beam was always proceeding along a 45-degree line, and if necessary to accomplish this result for a particular purpose, this is easily done by increasing—in this case—the amplitude of the vertical wave.

The sweep of the present invention is particularly useful in scanning procedures in which there is no preferred direction, since by use of this sweep all four independent directions are equally treated. Therefore, if an object has essential features which lie along lines which are different in direction from the lines of the sweep, this detail will automatically be resolved into one or more of the four directions of the sweep and will therefore receive equal treatment with any other direction. Another way of stating this is that any point has two coordinates which must lie in any one of the four quadrants. This feature, coupled with the constant velocity feature of the present invention allows one to perform any isotropic operation. In this particular application, it is possible that the velocity in the horizontal and vertical planes might have to be the same.

This method of sweeping is not limited to the pattern shown in Figure 2. In the most obvious modification the horizontal and vertical sweep voltages may be interchanged. Another way of obtaining some of the features of the present sweep is to use a regular television raster but rotate the pattern by sweeping four times during each frame, the rotation being of 90, 180, 270, and 360 degrees. An obvious disadvantage of this method is that there is still a fly-back time.

It will be apparent that the embodiments shown are only exemplary and that various modifications can be made in construction and arrangement within the scope of my invention as defined in the appended claims.

I claim:

1. A beam deflection circuit for producing a frame-sweeping scan in an electron beam tube of the type having separate deflecting means for deflecting the beam in rectilinear directions, comprising means for producing a closed loop sweep in which the beam during each frame traverses a scanning path defined by a pattern comprising a plurality of reentrant legs, the terminal point of the path coinciding with the point of sweep origin, said means comprising a first means for generating a triangular wave having a basic sweep frequency $f_1$, a second means for generating a triangular wave having a dependent sweep frequency $f_2$ which is related to $f_1$ in accordance with the equation $$f_2-f_1=f_1/M$$

where M represents the number of cycles of the basic sweep frequency which occur during one framing scan, and means for applying each of said triangular waves to a respective one of said separate deflection means.

2. An electron beam deflecting circuit as defined in claim 1 in which the means for producing a closed loop sweep comprises a master oscillator providing a base frequency source having a frequency $f_1$ said first triangular wave generating means being controlled by said source for generating triagular waves having a like frequency, and said second triangular wave generating means comprises means controlled by said source for fractionating said basic frequency, means coupled to said source and to said fractionating means for combining the source frequency and said fractionated frequency to produce said dependent frequency $f_2$, and means for converting said dependent frequency to a triangular wave.

3. A beam deflection circuit in accordance with claim 2 in which said combining means comprises an adjustable resolver and frequency controlled motor means for driving said resolver responsive to said fractional frequency.

References Cited in the file of this patent

UNITED STATES PATENTS

| | | |
|---|---|---|
| 2,292,045 | Burnett | Aug. 4, 1942 |
| 2,426,721 | Adams | Sept. 2, 1947 |
| 2,572,586 | Barney | Oct. 23, 1951 |
| 2,717,329 | Jones et al. | Sept. 6, 1955 |